United States Patent [19]

Byrum

[11] Patent Number: 4,497,118
[45] Date of Patent: Feb. 5, 1985

[54] MOTION AND ORIENTATION SENSOR

[76] Inventor: Barney L. Byrum, 7706 Tomlinson Ave., Bethesda, Md. 20034

[21] Appl. No.: 429,492

[22] Filed: Sep. 30, 1982

Related U.S. Application Data

[62] Division of Ser. No. 936,386, Aug. 24, 1978, Pat. No. 4,365,421.

[51] Int. Cl.³ .............................................. G01C 9/06
[52] U.S. Cl. ................................ 33/366; 200/61.45 R; 200/220; 340/689
[58] Field of Search .................. 200/61.47, 61.52, 220, 200/61.45 R; 73/516 LM; 340/689

[56] References Cited

U.S. PATENT DOCUMENTS

4,150,267  4/1979  Adrian et al. ..................... 200/220
4,167,733  9/1979  Krause et al. ..................... 200/61.52

Primary Examiner—William D. Martin, Jr.
Attorney, Agent, or Firm—Epstein & Edell

[57] ABSTRACT

A motion and orientation sensor and measuring device has an electric circuit contact actuated by a body of conductive fluid on disturbance of the conductive fluid by gravity, vibration or otherwise. A ball and socket joint adjustably mounts a disk-shaped container for the fluid through attachment of the ball to a support which may be structure of the object guarded by the sensor. A releasable internal-expansion locking mechanism in the ball and actuable from above laterally contacts the socket and fixes the angular relation of ball-to-socket as desired, and numerical measurement features are provided.

15 Claims, 11 Drawing Figures

MOTION AND ORIENTATION SENSOR

This application is a division of application Ser. No. 936,386, filed Aug. 24, 1987, now U.S. Pat. No. 4,365,421.

DESCRIPTION

This invention relates generally to motion and orientation sensors and specifically to fluid actuable motion and orientation sensors and measuring devices.

In the prior art various devices have been provided, none of which has disk geometry fluid switches, none of which is a measuring device, and it is believed that none provides the sensitivity, flexibility, and other advantages of the present invention.

U.S. Pat. No. 3,772,646 issued Nov. 13, 1973 to E. A. Keith et al discloses a pendulous mercury switch for detecting changes in inclination, a movable ball supported by a groove in the switch mount being employed together with an external locking mechanism acting on the ball, in contrast with fixed ball and internal locking provisions of the present invention, which differs also in other important respects. In particular, a basic geometrical difference greatly increases the flexibility, sensitivity and accuracy of the present invention. Specifically, the Keiths' sensing element is a tube as distinguished from a hollow disk in the present invention.

U.S. Pat. No. 3,562,706 issued Feb. 9, 1971 to B. D. Mason discloses a spring-suspended plumb type device held in normally spaced relation to an external ring, in contrast with the present invention.

Principal objects of the invention are to provide an extreme sensitivity motion and orientation sensor, monitor and measuring device with feasible and precise alarm level control which is universal in operation and quick, convenient and reliable in adjustment.

Further objects are to provide a motion and orientation sensor and measuring device as described which is durable and economical and which is adapted for most applications.

In brief summary given for purposes of cursive description only, the invention includes a ball-and-socket suspended disk-shaped container holding conductive fluid having electrical polarity opposite that of the disk top.

The above and other objects and advantages of this invention will become more readily apparent on examination of the following description including the drawings, in which like reference numerals indicate like parts:

Figure 1:
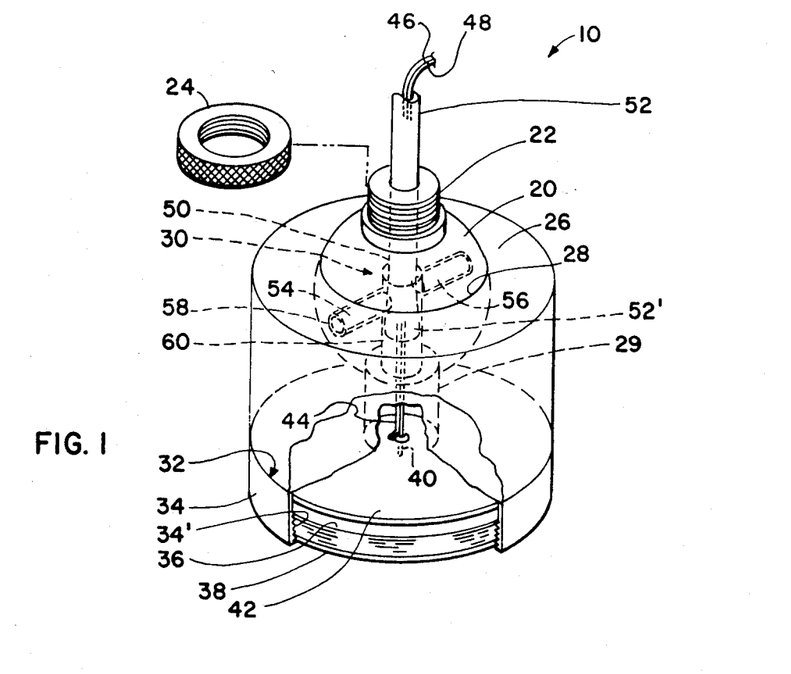
FIG. 1 is an isometric view partly in section.
Figure 2:
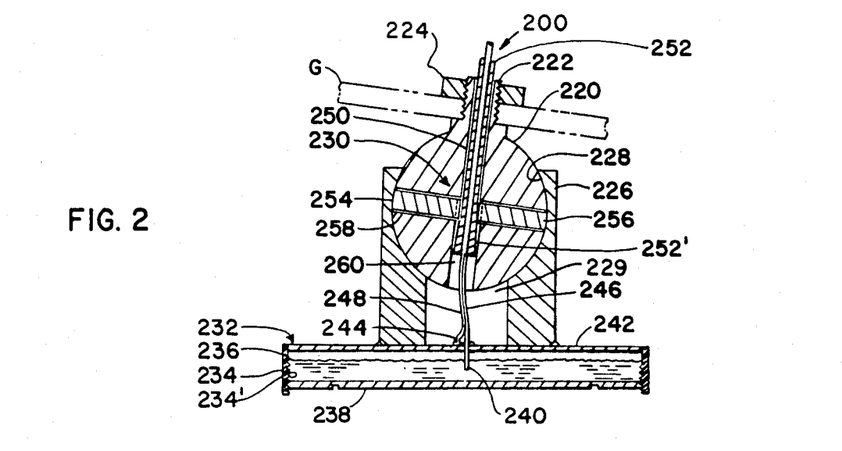
FIG. 2 is a side elevational view in section.

FIG. 1 illustrates an embodiment 10 of the invention.
FIG. 2 illustrates an embodiment 200 similar to embodiment 10 except that the disk-shaped bottom structure shown is larger in diameter in proportion to the structure above it.

Since like numerals indicate like parts, FIGS. 1 and 2 will now be described together in terms of embodiment 10. Embodiment 10 includes a ball 20, means such as upwardly extending screw 22 and nut 24 for fixing the ball to supporting structure, a pendulously balanced socket 26 supported by means of structure defining a spherical cavity 28 in it freely surrounding a great circle of the ball, a cylindrical opening 29 from the cavity downward through the socket, wedge-lock assembly 30 for fixing the angular relation of the ball and socket, wafer-shaped container or disk 32 the same diameter as the lower end of the socket and having the annular wall 34 of electrically insulative material, is supported by the lower end of the socket by welding, cementing, screwing in place or by other suitable means, a quantity of mercury 36 insufficient to fill the disk contained within the disk by a screw adjustable bottom 38 sustained by threads 34' and calibrated for reading void depth (h), a first electrode 40 extending centrally down through the disk top 42 and contacting the mercury, a second electrode 44 contacting the disk top 42, an electrically conductive material, respective electric circuit leads 46, 48 passing up from the electrodes through the tubular lower end of the socket and exiting through a portion of the lock assembly held in stepped bore 50 which extends coaxially through the ball and screw.

The wedge-lock assembly comprises a tube 52 having at the lower end an external conical taper 52' downwardly increasing in size, and opposed brake rods 54, 56 extending outwardly from the stepped bore in respective radial portions of a diametral passage 58 in the ball at right angles to the stepped bore. Said passage may be positioned south of the ball's equator.

Counterbore 60 extends upward past the diametral passage, exposing the inboard ends of the brake rods to the tapered portion of the tube. The outboard ends of the brake rods bear on the socket spherical cavity, effectively comprising expansion of a portion of the ball in the socket. The taper may be of the self-holding type. A greater number of brake rods may be employed if desired.

Supporting structure such as an object to be guarded is shown at "G" in the second Figure.

Figure 3:
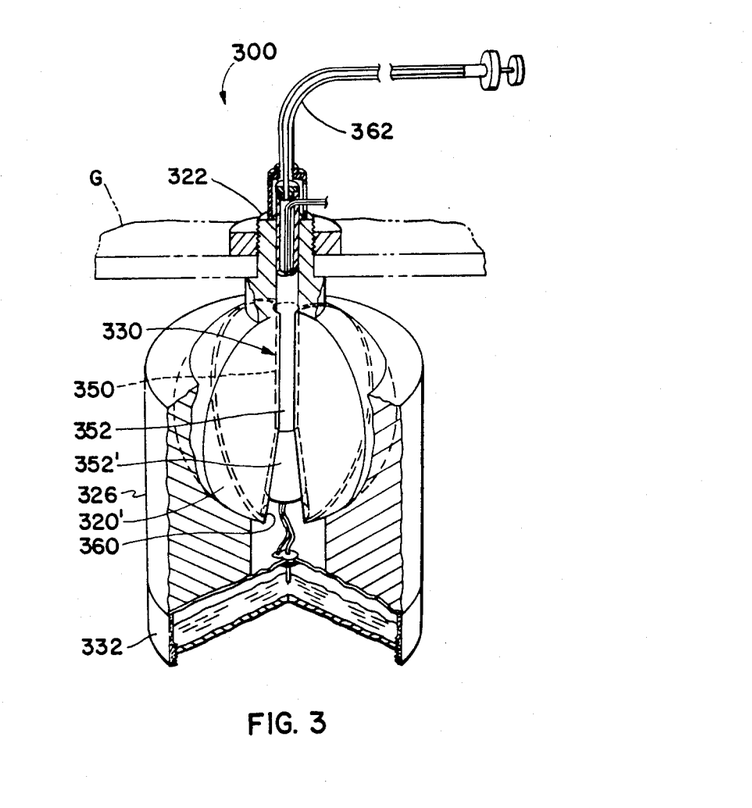
FIG. 3 is an isometric view partly in section and with a portion of the structure removed for exposition.

FIG. 3 illustrates another embodiment 300 of the invention generally similar to that of the first two Figures except that the wedge-lock assembly 330 flexibly expands the ball to lock, and the disk 332 is the sme diameter as the socket 326.

Wedge-lock tube 352 has a similar downwardly enlarging external taper 352' on the lower end which engages a corresponding tapered portion 360 of the bore 350 in the ball. The ball is vertically split into four equal quadrants 320' (one quadrant removed for clarity in the drawing) except at the top where the screw 322 joins the quadrants. This juncture may be welded.

For illustrative purposes, a flexible coaxial cable 362 may be used to actuate the wedge-lock assembly, the electric leads passing out to the side through appropriate apertures.

Figure 4:
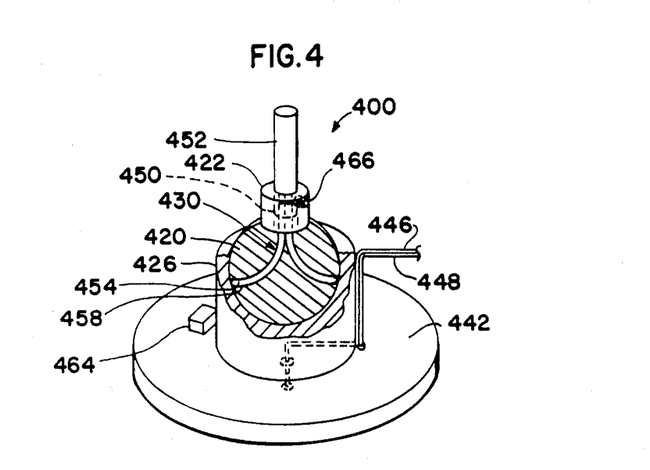
FIG. 4 is an isometric view partly in section.

FIG. 4 illustrates an embodiment 400, similar to those described except that a flex-lock system 430 is employed for adjustably affixing the relative angular position of the ball and socket, 420, 426. The electric leads 446, 448 exit from the top 442 of the disk outboard of the socket, and a counterbalance 464 is provided to compensate the offset portion of the electric leads.

The flex-lock system includes at least one and preferably a plurality of flexible wires 454 in respective downwardly divergent arcuate passageways 458 leading through the ball from north pole to south of equator. A plunger 452 slidably held in the counterbore 450 of a base 422 fixed at the top of the ball unites the upper ends of the flexible wires and a setscrew 466 through the side of the boss holds the plunger in any preselected position.

Figure 5:
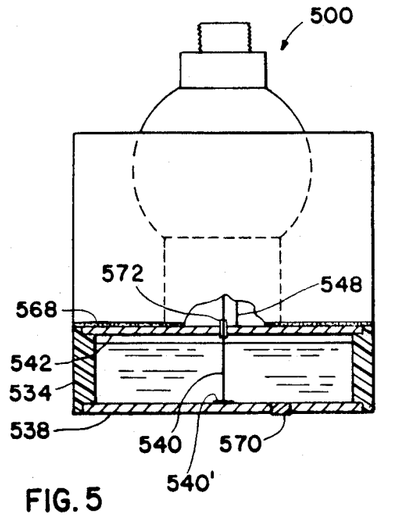
FIGS. 5 and 6 are side elevational views, partly in section.

FIG. 5 illustrates details of an embodiment 500 differing from the embodiments previously described in that the top of the disk is detachably attached to the socket by an adhesive layer 568 such as rubber-based adhesive for servicing purposes. The top 542 of the disk is isolated from the bottom 538 of the disk by a sidewall 534 made of plastic or other dielectric material sot that the top itself is the second electrode through its connection with an appropriate electrical lead 548. The first electrode 540 may have an enlarged lower end 540' soldered to the disk bottom 538. A filler plug 570 in the bottom is used with the instrument inverted. An insulative grommet 572 prevents leakage of mercury around the first electrode.

Figure 6:
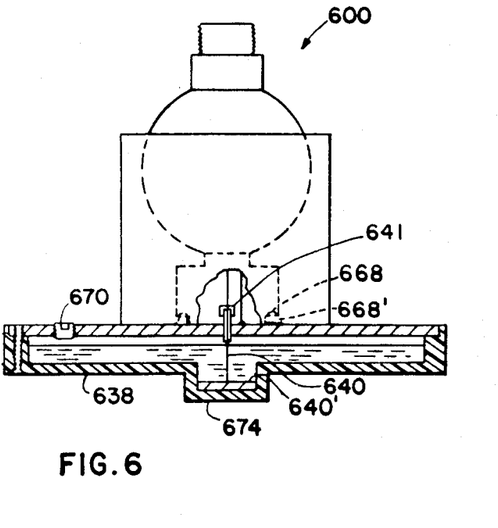

FIG. 6 shows details of embodiment 600 again similar to other embodiments herein described except that a depressed area or sump 674 coaxial with the disk is provided in the insulative disk bottom 638 and into this sump the first electrode's enlarged end 640' projects and is press fitted in place, better assuring contact with the mercury under severe agitation, and in addition the disk is detachably secured to the socket by fingers 668 on the disk which snap over and secure to corresponding lugs 668' projecting interiorly from the socket. A top filler 670 is provided outboard of the socket. An electrical junction 641 is located at the top face of the disk to facilitate servicing.

Figure 7:
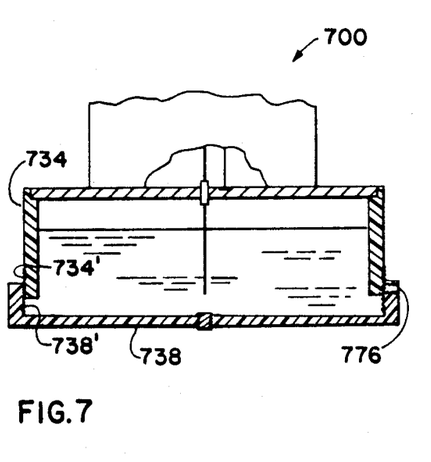
FIGS. 7 and 8 are side elevational details, partly in section.

FIG. 7 illustrates a detail of an embodiment 700 having external thread 734' on the disk insulative wall 734 coacting with internal threads 738' on the insulative bottom 738. A nylon setscrew 776 through the thread of the disk bottom may be employed to fix the screw adjustment of mercury level.

Figure 8:
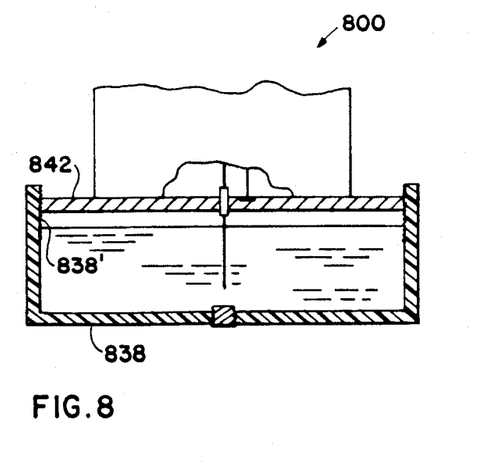

FIG. 8 illustrates details of embodiment 800 which provides a threaded periphery on the top 842 of the disk coacting with internal threads 838' on the sidewall of the one-piece insulative bottom 838.

Figure 9:
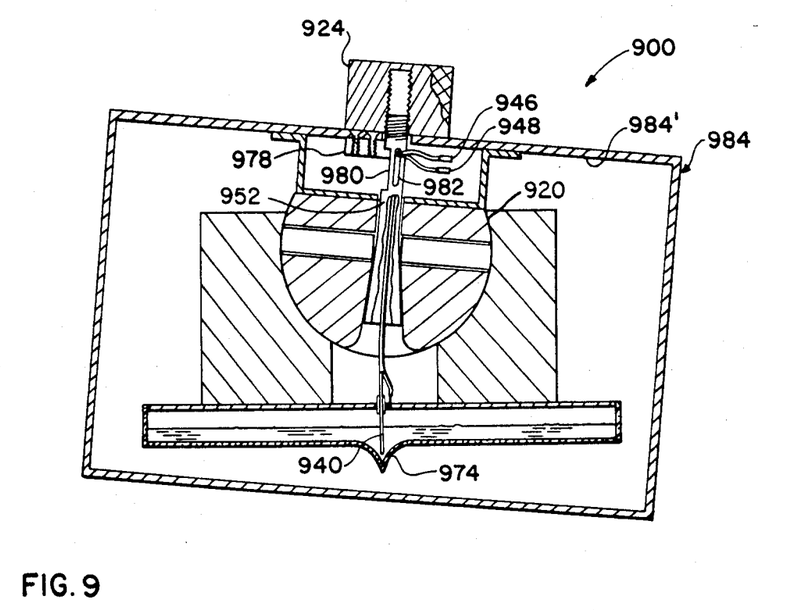
FIG. 9 is a side elevational view in section.

FIG. 9 shows an embodiment 900 having the first electrode 940 protruding into a small conical-cusp shaped sump 974. A key 978 in a slot 980 in tube 952 limits travel of the tube vertically and prevents rotation. Threads on the upper end of the tube permit drawing the tube upward using a knurled nut 924. Electric leads 946, 948 emerge from the side of the tube at slot 982 and can be connected from that point in any desired manner. Box-like or can-shaped housing 984 supports ball 920 at the underside of the top 984' of the housing exemplifying means of support both protecting the assembly and enabling it to rest stably upon a suface or to be attached to a surface of arbitrary orientation by means of suitable brackets.

Figure 10:
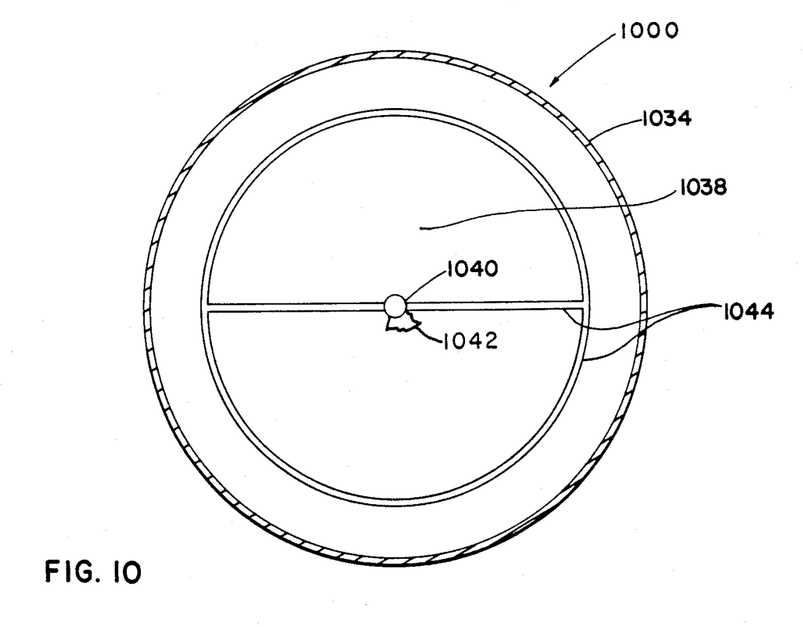
FIG. 10 is a plan sectional view.

FIG. 10 is a top plan view in section showing disk bottom 1038. The disk is similar to that in the first Figure except that the first electrode 1040 extends centrally down through the disk top and contacts the mercury via a ring-shaped electrode 1044 fixed coaxially in the disk bottom 1038, a non-adjustable (non-screw thread) configuration of plastic or other suitable dielectric material. A single piece of dielectric material forms the disk wall 1034 and disk bottom 1038.

Figure 11:
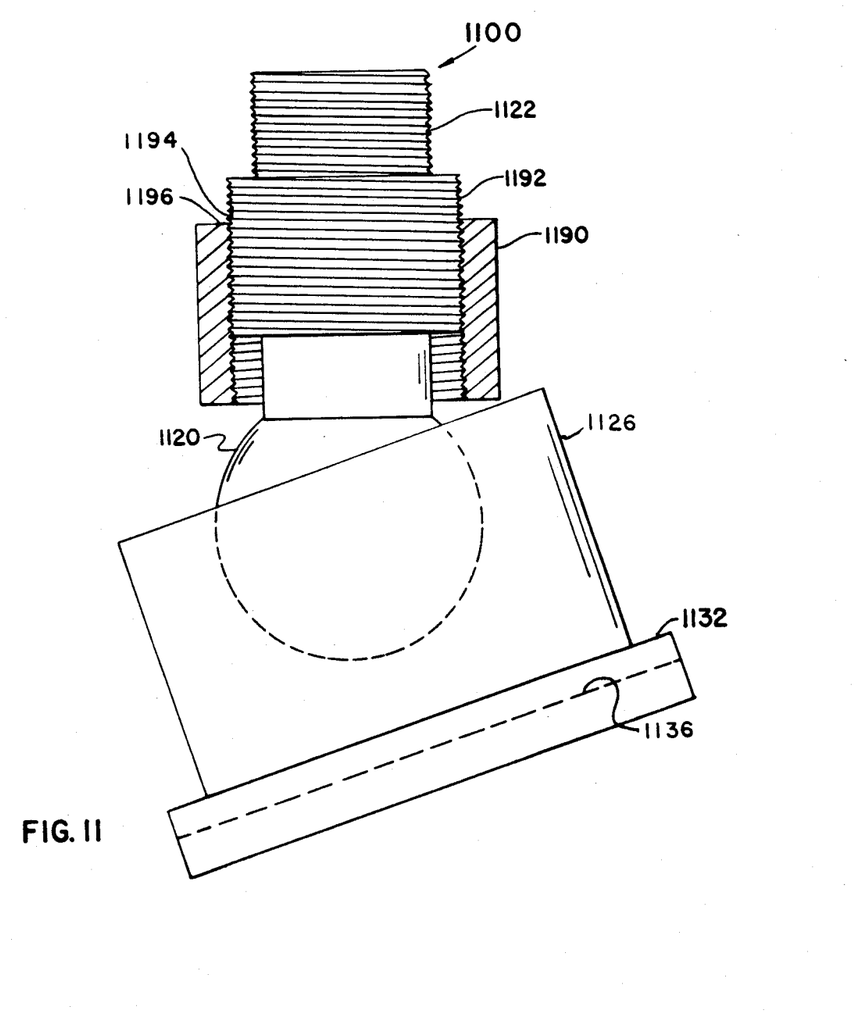
FIG. 11 is an elevational diagrammatic view.

FIG. 11 diagrams a y-gauge arrangement adapting the sensor of this invention for numerical determination of the degree of levelness or verticality.

Provided as before is ball 1120, means for fixing the ball to other structure as before described, preferably in the form of integral stepped screw 1122; the lower part of this in the present embodiment has external micrometer threads 1192 on which a complementary threaded micrometer collar 1190 fits. The lower end of the collar is square with the axis for measurement purposes, being adapted to descend and touch the upper surface of socket 1126 which surface is made parallel to the mercury surface 1136 in the level position. Details not shown may be those of any of the other embodiments.

In operation, as will be seen, the angle between the axis of the disk and the axis of the micrometer arrangement is ascertainable by noting the displacement of the micrometer collar from a fiducial or initial position to a position which produces contact between it and the socket. Contact may be indicated by disturbance of the mercury resulting in a signal.

Fiducial marks 1194 and 1196, on the screw-related parts respectively, diagrammatically represent a means of establishing measure of displacement.

By means of a micrometer screw disk bottom and/or disk wall calibration or otherwise in various embodiments of the device, threshold components of the object's acceleration and threshold values of is angular speed are ascertainable in the horizontal plane when signal occurs by noting disk void depth (h) in the level position. Similarly, body bending with respect to the vertical and threshold vibration levels of the object can be ascertained.

It will be appreciated that conventional means of assembling the device may be employed, including as convenient casting the ball or portions thereof in place as by the lost-wax process, or assembling the socket around the ball. Materials may be stainless steel or other suitable material for the metallic parts and thermoplastic for the insulative parts. Joining may be by welding, brazing or cementing, as appropriate by conventional practice.

SUMMARY OF THE DISCUSSION

The universal motion sensor is simply an electrical switch which is actuated by acceleration, acceleration change, orientation, orientation change, or vibration of the object in or on which the sensor is placed or to which the sensor is attached. Underlying any given application is the basic principle that the sensor detects: (i) the vertical when at rest or in unaccelerated motion; (ii) movements of the entire object through acceleration and/or changes of orientation of the object; and (iii) relative movements of parts of the object through vibrations or strains. There is a family of sensors called Type A that must be manually leveled, and a self-leveling family called Type B. Sensor sensing and measuring capabilities are of sufficient range to permit: (a) highly delicate, qualitative motion detectors; (b) crude measuring devices; and (c) precise instruments for certain measurements. A wide range of useful sizes may be designed, with certain conditions governing Type B possibilities. The weight of the device may range from several grams to many kilograms.

Generic Description

The sensor, a motion and orientation sensing and monitoring device for detecting and/or measuring when it is level or otherwise oriented and when its acceleration and/or impulse with respect to the horizontal plane or neutral plane of reference deviates more than a specified amount, is an electric, fluid-actuated switch with integral sensing/signal element, output signal of which indicates when said deviation occurs or when a monitored state of orientation changes by more than a specified amount, the device comprising (1) sensing/signal element, a hollow, circular disk partly filled with mercury or other suitable conductive fluid; (2) suspension system for disk; (3) mechanism for finding neutral position, plane or region, defined as status quo when switch output signal pattern characterizes the non-alarm mode of switch operation, manually or automatically via mechanical controls and/or knowledge of forces exerted on the disk; (4) means of fixing disk in neutral position; (5) standardized connectors for fastening disk to suspension system; (6) means for adjusting and measuring void depth in disk; (7) means for measuring length of a specific line segment in conjunction with determination of orientation of the device with respect to the vertical; (8) source of electrical power (a small dry cell battery, e.g.); (9) various electrical leads and junctions; and (10) housing and/or brackets suitable for properly placing sensor on surface slopes ranging from horizontal to vertical. See FIGS. 1 through 11 for illustrations of the basic design and variants of the device.

The sensor disk, a right circular cylinder (with certain variants) of radius R and height H, is filled with mercury to a depth H - h, where h is void depth. Disk geometry is that of a wafer when the disk thickness is very small in comparison with its diameter. More specifically, the ratio 2R/H ranges from unity to several thousand.

Void depth, partial air evacuation of which may be required for very small values of h, may range down to the order of $10^{-4}$ millimeter. The theoretical lower limit of h, imposed by the thermal expansion coefficient of liquid mercury, is approximately H, in millimeters, times 0.014. For void depths of any order, H is at least twice h.

The disk wall is an electrical insulator made, e.g., of a plastic material, and the top and bottom of the disk are electrical conductors made, e.g., of stainless steel, molybdenum, or plated material having good mercury compatibility and acceptable electrical properties, FIGS. 4 and 5. As an alternative design, the top of the disk is a conductor, the wall and bottom are insulators, and a conductor (wire, rod or ribbon of suitable material) is set in the bottom of the disk as shown in FIG. 10, or otherwise exposed to the mercury, as shown in FIGS. 6 through 9. In any event, the top of the disk and the mercury are electrically charged with opposite polarity, FIGS. 1 through 11. This is accomplished by means of electrical leads which enter the sensor through either the fixed or movable part of the suspension system. The leads are suitably flexible and of proper length, size and arrangement to reduce fatigue and other wear of themselves, to accommodate torques about the disk/socket axis, and to reduce frictional drag on the disk/socket body as it revolves with respect to the suspension system. Disk diameter may be equal to, greater or less than that of the structural member to which the disk is attached.

There are two basic types of this motion sensor distinguished by the manner in which the sensor is set in neutral position: Type A, manual setting, and Type B, automatic setting. The sensor is said to be in neutral position when it is set in its non-alarm mode of operation.

For Type A sensors, the wall of the disk may have a suitable window and neutral/level line or other means may be used to observe the slope of the mercury surface while adjusting disk orientation to neutral position. Such adjustment may be accomplished by means of any suspension system which permits the desired rotational degrees of freedom. For example, a simple joint based on the principle of those commonly used on the legs of furniture to reduce floor pressure is feasible or, as an alternative, the simple joint and control linkage commonly used to adjust automobile side mirrors. Since the Type A sensor does not level itself, its design possibilities are not controlled by the "sizing condition" defined in item (23) this section under basic design parameters and relationships among them. For this reason alone, it is a very different family of sensors from that of Type B. Clearly, the Type A sensor can be constructed economically and is feasible as a motion sensing device where only qualitative measurements suffice. Furthermore, theoretically, the Type A sensor can be made to achieve any desired degree of sensitivity and accuracy since its disk radius can be increased without limit. In reality, however, it is inherently a less precise instrument than Type B unless the manual leveling process is done by means more sophisticated than simple bubble levels.

For automatic adjustment to neutral position, a self-actuating universal joint is the preferred means of suspension. Consequently, for Type B sensors, the disk is suspended from housing ceiling or plate or y-gauge bottom by means of a universal ball and socket, where the socket (a cylindrical block of radius r containing the cavity of diameter D for the universal ball) is fixed to the top of the disk and allowed to swing on the ball which is fixed to the sensor housing ceiling or plate or y-gauge bottom. The mass distribution of the disk-/socket body is made symmetrical with respect to the axis of the disk. Friction between the fixed ball and movable socket is set large enough to quickly damp out pendulous motion of the disk and socket, but small enough to let the disk, when it is free to move under the influence of gravity and friction only, come to rest with its axis practically coincident with the vertical. If necessary, the neutral position lock may be used as a means of intermittent braking to reduce damping time to neutral position. When rest condition is achieved in the static equilibrium case, the mercury surface lies in the horizontal plane and the sensor is in neutral position. The status quo permits orientation measurements of the object with respect to the horizontal plane and/or its normal.

For measurements or for monitoring duty, the sensor may be fixed in neutral position by means of a wedge lock, FIGS. 1, 2 and 9. When actuated, this lock moves two or more rods through the ball surface at three points, e.g., equidistance apart. These brake rods, which may be curvature matched with the socket wall and/or tipped with suitable material, come against the socket surface, stopping relative motion of the ball and socket and fixing the sensor with respect to the object. As alternatives to the wedge lock, the flexure wedge lock or flex wire lock. FIGS. 3 and 4, respectively, may be employed. An auxiliary shipping/storage lock of simple design may be provided.

When the sensor is ready to operate as a monitorig device, the guarded object is either in static equilibrium or a specified range of motion, the mercury switch is either open or closed (continuously or intermittently), and the sensor is fixed in neutral position. For example, when the guarded object is a rigid body, initially in static equilibrium, the switch is open until motion of the guarded object disturbs the liquid mercury surface sufficiently from its neutral position to close the switch and set off the alert/alarm system. Any disturbance of the guarded object from equilibrium which causes or tends to cause acceleration, vibration, and/or orientation change of the object makes the mercury move about in the disk which, in turn, closes the switch and sends an alerting signal to insure that proper action is taken. The alerting signal or incipient alarm is a small electric current that passes through the sensor and actuates a larger power supply, e.g. which, in turn, enables other corrective action-producing components of the alarm or control system to go into operation.

For the general class of cases where the guarded object is initially in motion and may itself be an elastic body or a gaseous or liquid medium, neutral positions of the mercury surface can be described within a framework of dynamics based on normal or expected behavior of the object or medium. In such cases, neutral positions are inclined to the horizontal plane and are variable within limits which can be specified as safe or standard for given situations. Furthermore, the closed instead of open switch, or a specified range in the ratio of switch open time to closed time, may be the normal mode of sensor operation when set in neutral position. Therefore, for the general case, neutral regions as distinguished from neutral positions characterize the safe or standard situation, and sufficient variance from the standard or neutral plane of reference produces a sensor signal pattern which can be interpreted by an auxiliary component as the alerting signal. Consequently, the basic principles of sensor design and operation in the general case are essentially the same as those described for the more restrictive class of cases where the guarded object is a rigid or quasi-rigid body normally in a stationary mode when the sensor is set in neutral position with switch open.

When the sensor is being used for measurement purposes, as distinguished from simply detecting motion, the underlying principles of operation are best shown by describing representative idealized cases. Initially, in each such case, it is assumed that the sensor is fixed in neutral position, that it is at rest or in unaccelerated motion, and that it is attached to a surface arbitrarily oriented in space. Under such conditions, the mercury surface is almost perfectly level and the disk/socket axis coincides with the vertical to a high degree of accuracy. In any event, a properly designed Type B sensor free to move under the influence of gravity and friction automatically brings its disk/socket axis arbitrarily close to the vertical. The following examples serve to illustrate basic measuring capabilities of the device:

(i) Let the angle A between the actual disk axis and its neutral position in space be increased from zero in such a way that no acceleration is imparted to the sensor. The minimum value $A'$ of A that is detecable by the sensing system is defined as its sensitivity to deviations from the vertical. To a close approximation, $A'$ equal to the arc tangent of h/R for any angle or to h/R radian for small angles. Table 1 data are indicative of the range in $A'$, h and R.

(ii) Assume the sensor is suitably housed or bracketed and that orientation of the surface to which it is attached is to be determined with respect to the vertical. By means of the y-gauge described in the section entitled Design Variance and Considerations, let y be measured. Then, Y−y is known and orientation $B'$ of the surface is known to within arc tan h/R. If desired, the uncertainty can be made negligible by adjusting h to smaller values. If $B'$ is zero (i.e., if y equals Y), the surface is either level or vertical to within arc tan h/R depending upon details of the sensor bracket attachment.

(iii) Let the sensor experience uniform acceleration without rotation and let the component of this acceleration measured in the horizontal plane be denoted by a. Then, the minimum detectable value $a'$ of a is given by $a' = gh/R$, where g is the acceleration of gravity and steady state conditions in the mercury are assumed. Before the mercury reaches the state of dynamic equilibrium for which the steady state solution is valid, transient effect prevail. It is recommended that empirical means be used to determine transient solutions of interest.

(iv) Let a defined in item (iii) above arise entirely from rotation of the sensor at constant angular velocity V about a center point in the horizontal plane distance $p'$ for disk axis. Then, the minimum detectable magnitude $V'$ of V is $$V' = (gh/R)^{\frac{1}{2}}(p'+\bar{p})^{-\frac{1}{2}}$$

in which $p'$ is greater than or equal to zero and $\bar{p}$, the distance from disk axis to mercyry center of mass, is approximately given by $$p = \pi q_2 R^3 h/3m = Rh/3(H-h)$$

where m is mass of mercury in the disk and $q_2$ is density of mercury.

(v) Let the sensor experience a vaibration due to an impulse or to some other initial or continuing condition. This causes a wave disturbance in the mercury. For any such case, the minimum detectable vibration is that which produces one or more waves of amplitude h. Fortunately, in any specific situation of this type, the hollow, circular disk is among those few simple shaed cavities for which the three-dimensional wave equation can be solved by the method of separation of variables. In general, however, empirical solutions are recommended to determine quantitative meaning of sensor signal output patterns resulting from instances of this type.

The basic design parameters and relationships among them are defined as follows:

(1) A, the angle between actual disk axis and its neutral position in space when disk is level.

(2) $A'$, minimum value of A for which an alerting signal is transmitted by the sensor, equals arc tan h/R. (This is the condition for orientation change only. See discussion in above paragraph for other conditions and considerations. )

(3) R, inside radius of disk.

(4) R*, outside radius of disk.

(5) r, outside radius of socket, where socket is defined as cylindrical block which contains cavity for ball.

(6) h, disk void depth, defined as distance of mercury surface from the top inside surface of disk when sensor is in neutral position with disk level.

(7) H, inside axial length of disk.

(8) H*, outside axial length of disk.

(9) Alert/alarm condition, angle A is equal to or greater than arc tan h/R. (This is the condition for orientation change only. See discussion in above paragraph for other conditions and considerations.)

(10) D, diameter of ball connecting disk and socket to sensor housing ceiling or suspension plate or y-gauge bottom.

(11) b, normal distance from south pole of ball to center of the top outside surface of disk.

(12) c, distance from center of ball to top center of socket, is made large enough to keep within acceptable limits the normal (radial) force N, the tangential force T', and the resulting force P per unit area at interface of ball surface and socket cavity wall. The magnitude of each force, assumed uniform in the zone supporting the load, follows: $N = 8mgc^2/kD^2$, $T' = N(-1 + kD^2/8\pi c^4)^{\frac{1}{2}}$ and $P = 2mg(2/k\pi)^{\frac{1}{2}}/D$, where $k/\pi = 2c^2 + D^2E^2/2 + 2cDE(1 - 4c^2/D^2)^{\frac{1}{2}}$, E is arc sin 2c/D, and mg denotes total weight of disk/socket body. The slope of N is tan $E^*$, where $E^*$, the north latitude of ball, ranges from zero to arc sin 2c/D. N and T' are normal to each other and P is their vector sum.

(13) d, diameter of circle in plane parallel to equatorial plane in northern zone of ball within which the supporting framework 22 (flanged or threaded collar, neck or screw, e.g.) for the sensor is attached.

(14) H', axial length of socket, equals $b + c + D/2$. If c is too large to permit heat/pressed fitting of ball into socket, the socket may be made as two half cylinders of length H' or as two whole cylinders of lengths c and $b + D/2$, the ball placed in its cavity, and the two parts of the socket joined together by appropriate means. In general, the socket may be cut into two parts by any plane which intersects its spherical cavity in a great circle arc or the ball may be cast in place.

(15) B', angle between the normal to the guarded object (in vicinity of sensor location) and the axis of the disk when sensor is in neutral position with disk level, equals arc tan $[M^*W/W^{*2} - (M^{*2} + W^{*2})^{\frac{1}{2}}/W^{*2}]$, where $M^* = M + 1$, $M = (Y - y)/c$, $W^{*2} = W^2 - 1$, and $W = D^*/2c$. (See the discussion in section entitled *Design Variance and Considerations* for further details.)

(16) B, the largest value of B' from which orientation of the sensor can adjust to neutral position without an alteration in orientatin of sensor housing ceiling or suspension plate, equals arc tan $[d(D^2 - d^2)^{\frac{1}{2}} - 2c(D^2 - 4c^2)^{\frac{1}{2}}]/(d^2 - 4c^2)$. In other words, the sensor can only be set in neutral position for values of B' greater than or equal to zero and less than or equal to B unless the normal to the guarded object's surface the neighborhood of the sensor is figuratively changed, by shimming, for example.

(17) s, length of flexible electrical lead from south pole of ball to center of top outside surface of disk, is greater than or equal to the square root of $b^2 + (b + D/2)(1 - \cos B)D$.

(18) u, axial length of cylindrical cavity made in socket for accommodation of electrical leads and junctions to disk, and for assembly and servicing, is greater than or equal to $b + (1 - \cos B)D/2$.

(19) w, diameter of cylindrical cavity defined in item just above, is greater than or equal to $e + D \sin B$, where e denotes effective diameter of electrical leads.

(20) x, distance from north pole of ball to plane of circle having diameter d, is equal to $D/2 - (D^2 - d^2)^{\frac{1}{2}}/2$.

(21) L, distance from ceiling of sensor housing or from bottom of sensor suspension plate to plane of circle having diameter d, is greater than or equal to $r \sin B + c \cos B - (D^2 - d^2)^{\frac{1}{2}}/2$ for all cases where $R^*$ is less than or equal to r, and also for any case where $R^*$ is greater than r and the value of $R^* - r$ is less than or equal to H' ctn B. For any case where $R^*$ is greater than r and the value of $R^* - r$ is greater than or equal to H' ctn B, the distance L is greater than or equal to $R^* \sin B - (b + D/2)\cos B - (D^2 - d^2)^{\frac{1}{2}}/2$.

(22) $G^*$, distance from center of ball to center of mass of disk/socket body, equals the square root of $(\bar{p})^2 + (\bar{z})^2$, where $\bar{p}$, $\bar{z}$ are coordinates of the disk/socket body center of mass referred to a coordinate system fixed in the disk/socket body and having its origin (0) at center of ball and its z-axis, coincident with disk/socket axis, taken as positive downward. If actual geometry is used, the coordinates of the center of mass can only be expressed in terms of elliptic functions. A less rigorous solution, satisfactory for most engineering purposes, can be obtained in terms of elementary functions by replacing the disk/socket body with a lamina, said lamina containing the disk/socket axis. Using the lamina model deflected about pivot point (0) an angle A to right of equilibrium position axis (i.e., the vertical), rectangular Cartesian coordinates p and z taken as positive to right and downward, respectively, and area densitites on the lamina expressed in terms of volume densities in the disk/socket body, integration yields the following center of mass coordinates:

$$\bar{p} = -\pi R^4 q_2 (\tan A)/3m \quad (1)$$

$$\bar{z} = K/m - \pi R^4 q_2 (\tan A)^2/6m$$

when $H \geq 2h$ and $0 \leq \tan A \leq h/R$;

$$\bar{p} = -\pi R^3 q_2 h/m + 2\pi R^2 q_2 h(Rh \, \text{ctn} \, A)^{\frac{1}{2}}/3m \quad (2)$$

$$\bar{z} = K/m - 2\pi R^2 q_2 h(Rh \tan A)^{\frac{1}{2}}/3m + \pi R^2 q_2 h^2/2m$$

when $H > 2h$ and $h/R \leq \tan A \leq H^2/4Rh$; and $$\bar{p} = -\pi R^3 q_2 h(1 - h/H)/m + \pi R q_2 H^3(\text{ctn} \, A)^2/48m \quad (3)$$

$$\bar{z} = K/m - \pi R^2 q_2 h(H - h)/2m + \pi R q_2 H^3(\text{ctn} \, A)/24m$$

when $H \geq 2h$ and $H^2/4Rh \leq \tan A \leq \text{infinity}$; where $K/\pi R^2 q_2 = K_1 + K_2/R + K_3/R^2$; $K_1 = (C_1 + C_2)/\pi q_2$;

$K_2 = 2C_3/\pi q_2$; $K_3 = (C_4 + K_0)/\pi q_2$;

$C_1/\pi q_2 = (H - h)(b + T^* + D/2 + H/2 + h/2)$;

$C_2/\pi = q_3(b + D/2 + T^*/2)T^* + q_5(b + D/2 + H^* - T/2)T$;

$C_3/\pi = q_4 H^*(R^* - R)(b + D/2 + H^*/2$;

$C_4/\pi = C_3(R^* - R)/\pi$;

$K_0 = qr(H' - u - c)^2 - qrc^2 + 2q[D^2/4 - (H' - u - c)^2]^{3/2}/3 - 2q(-c^2 + D^2/4)^{3/2}/3 + qu(2r - w)(2H' - 2c - u)/2$;

$q = q_1 v/S$; $v/\pi = H'r^2 - uw^2/4 - (D^3 + 3cD^2 - 4c^3)/12$;

$S = 2rc - c(-c^2 + D^2/4)^{\frac{1}{2}} - D^2(\text{arc} \sin 2c/D)/4 + (2r - w)u - [D^2 \text{arc} \sin 2(H' - u - c)/D]/4 + (H' - u - c)(2r - w/2)$;

m is mass of disk/socket body; T is thickness of disk bottom; $T^* = H^* - H - T$ is thickness of disk top; and $q_1$ through $q_5$ is density of socket, conductive fluid, and disk top, wall, and bottom, respectively. The disk wall thickness, $R^* - R$, may be taken as constant over various ranges of R and, in general, may be treated as a parameter as distinguished from a variable.

(23) F, the sizing function, is the magnitude of the restoring torque arm and is equal to $\bar{z} \sin A + \bar{p} \cos A$. If the disk/socket axis is to align itself with the vertical when the sensor is in static equilibrium neutral position, the sizing condition, F greater than zero for all A greater than zero, must be met. (See the discussion in section entitled *Design Variance and Considerations for details.*)

(24) Equation of motion for disk/socket body seeking neutral position in static equilibrium case is approximately $(Q+dI/dt)dA/dt+I(d^2A/dt^2)=-mgF$, where t denotes time, g the acceleration of gravity, and I the moment of inertia given by $mG^{*2}=m(\bar{p})^2+m(\bar{z})^2$. It is assumed that sliding frictional torque is proportional to angular speed. It may be assumed that $Q=JD^2/4$, where J is a properly chosen proportionality constant (having dimensions dyne-sec/cm in the cgs-system) relating frictional force between ball and socket to linear speed of a point on the socket distance $D/2$ from pivot point (0). When $dA/dt$ vanishes, the sliding frictional torque, $QdA/dt$, is replaced by the starting frictional torque, which may be assumed to be $-\pi\mu cD^2N/2$, where $\mu$ is the coefficient of static friction between ball and socket. Note that when $dA/dt$ vanishes, no motion ensues unless $F-4\pi\mu c^3/k$ is greater than zero. Hence, this inequality is a refinement of the sizing condition and may be used to control instrument error with respect to the vertical to within $A^*$, the value of A which compels the inequality to zero.

Design Variance and Considerations

Clearly, both R and h can vary over a wide range and still satisfy the sizing condition and fabrication requirements. At very small values of h, however, operation of the sensor is complicated by internal and surface forces in the mercury. These and other considerations, such as manufacturing difficulties, may limit the smallest feasible value of h to greater than that set by the thermal expansion coefficient of mercury. Given the desired A' and sensor application, feasibility of sensor design, production and operation is the major guide line for selecting proper working ranges and values of R and h. In general, R and h may range from microscopic sizes to the order of one meter. Where practical, of course, small values of R and h are ideal because they result in reduced size and cost of the sensor. For various fixed values of H and representative ranges of R, Table 1 shows corresponding values of A'.

TABLE 1

| Minimum Detectable Change in Orientation | | |
|---|---|---|
| h,mm | R,mm | A', deg. |
| 0.01 | 0.1 | 5.71 |
|  | 1.0 | 0.57 |
|  | 10.0 | 0.057 |
|  | 100.0 | 0.0057 |
| 0.10 | 1.0 | 5.71 |
|  | 10.0 | 0.57 |
|  | 100.0 | 0.057 |
| 1.00 | 10.0 | 5.71 |
|  | 100.0 | 0.57 |
| 2.00 | 10.0 | 11.31 |
|  | 100.0 | 1.15 |
| 3.00 | 10.0 | 16.70 |
|  | 100.0 | 1.72 |
| 8.00 | 20.0 | 21.80 |

TABLE 1-continued

| Minimum Detectable Change in Orientation | | |
|---|---|---|
| h,mm | R,mm | A', deg. |
|  | 100.0 | 4.57 |
| $R(3)^{-\frac{1}{2}}$ | R | 30.00 |
| R | R | 45.00 |
| $R(3)^{\frac{1}{2}}$ | R | 60.00 |
| 5R | R | 78.69 |
| 10R | R | 84.29 |

In order to find the degree of levelness or verticality (i.e., the angle B') as distinguished from deviation in an arbitrary orientation, a linear measurement is required. For any neutral position of the sensor, B' can be found by measuring the shortest length (y') in a family of line segments each of which begins at a reference point (e.g., the sensor suspension plate, housing ceiling, or y-gauge bottom), to which it is normal, and ends at a point on an ellipse formed by the intersection of a plane and the right circular cylinder having diameter $D^*$ and axis an extension of the ball's north-south diameter.

Let Y and y denote values of y' when said plane, taken as the top surface of the socket, corresponds to $B'=0$ and $B'\neq 0$, respectively. The, it is the difference $Y-y$ that must be determined since it can be shown that $$\tan B' = (Y-y)/(D^*/2 + c \tan B'/2)$$

from which, $$\tan B' = M^*W/W^{*2} - (M^{*2} + W^{*2})^{\frac{1}{2}}/W^{*2}$$

where $$M^* = M+1, \, M=(Y-y)/c, \, W^{*2}=W^2-1, \text{ and } W=D^*/2c.$$

Since Y is a fixed value, the difference $Y-y$ is known when y is measured. A means (defined as a y-gauge) of measuring y is illustrated in FIG. 11, where only the principles involved are shown. The precision (inside threaded screw) micrometer, 1190, a right circular cylinder having wall thickness $(D^*-d^*)/2$ and height greater than $L'-c+(D^2-d^2)^{\frac{1}{2}}/2$, rotates on the fixed cylinder 1192 (outside threaded nut) of diameter $d^*$, where $d^*$ is equal to or greater than $(D^2-4c^2)^{\frac{1}{2}}$, $D^*$ is greater than $d^*$ and less than $2r \cos B - 2c(1+\cos B)\tan B/2$, and L' is the distance from bottom of 1192 to plane of circle having diameter d. Clearly, with respect to the bottom face of the threaded portion of 1192 as a reference point, $$y\text{-}max = Y,$$

$$y\text{-}min = Y - D^*(\tan B)/2 - c(\tan B)(\tan B/2), \text{ and}$$

$$Y = L' - c + (D^2 - d^2)^{\frac{1}{2}}/2.$$

Hence, the required range of vertical travel for the moving contact, shown not quite touching the datum plane 1126 in FIG. 11, is less than $D^*(\tan B)/2 + c(\tan B)(\tan B/2)$. When the moving contact touches the datum plane, the difference $Y-Y$ is known and can be read from a dial or elsewhere. The instant of contact may be judged by the resulting alert/alarm signal caused by the induced torque and corresponding elastic flex of the system, or a ratchet stop may be a suitable alternative. A y-gauge can be made to simply enable the operator to find $Y-y$ manually, from which the operator determines B', or it can be designed to do both of these operations. It may be incorporated into a special sensor collar or suspension plate or it may be designed as optional equipment for use with the standard collar 1122 or suspension plate.

Using differentials as approximations of increments/decrements and assuming a certain value for the required accuracy, var B', it can be shown that the tolerable errors, var D* and var c, are greatest when B' is a small angle, and that the tolerable error, var (Y−y), is greatest when B' is a large scale. Table 2 presents data to illustrate these points, and also reveals the need to know c and D* to better than $2.16 \times 10^{-2}$ mm ($8.5 \times 10^{-4}$ inch) and Y−y to better than $3.81 \times 10^{-3}$ mm ($1.5 \times 10^{-4}$ inch) when high precision in B'(less than a minute of arc, e.g.) is required. In this example, D*=25.4mm and c=6.35mm.

TABLE 2 y-Gauge Tolerable Errors

| B' (degrees) | var Y − y/var B' (mm/radian) | var D*/var B' (mm/radian) | var c/var B' (mm/radian) |
|---|---|---|---|
| 0 | 12.70 | infinity | infinity |
| 1 | 12.81 | 1468 | 84125 |
| 5 | 13.36 | 305.3 | 3498 |
| 10 | 14.23 | 161.4 | 922.5 |
| 20 | 16.84 | 92.56 | 262.4 |
| 30 | 21.17 | 73.33 | 136.8 |
| 40 | 28.60 | 68.17 | 93.65 |
| 50 | 42.52 | 71.35 | 76.51 |
| 60 | 72.80 | 84.05 | 72.80 |

Sizing is an essential design consideration. The sizing function F is an implicit function of 2 variables, R & A, and 17 parameters: D, H, h, $q_1$, $q_2$, r, u, c, w, b, H*, R*, R*−R, T, $q_3$, $q_4$, and $q_5$. Adjustable h introduces an additional parameter $Q_1 \geq$ unity, where adjustable h equals its initial value times the reciprocal of $Q_1$. When each parameter is assigned a numerical value, that group of numbers is called a set of design parameters. An infinite number of such sets exist, a class C of which allows F to be greater than zero for $0 \leq R \leq R_c$ and is therefore composed of self-leveling sensors. A subclass C' of C is composed of feasible sensors. When seeking specific elements of C that compose C' and are of design interest, one is guided by size desired, sensitivity required, the economics of production, and other practical considerations.

The sizing condition is $F > 0$, $0 < A \leq 90°$, where $F = \bar{z} A + \bar{p} \cos A$. Upon substitution for $\bar{p}$, $\bar{z}$ in terms of sensor design parameters and variables, the sizing condition becomes:

$$[K - \pi R^4 q_2 (\tan A)^2/6 - \pi R^4 q_2/3](\sin A)/m > 0 \quad (4)$$

when $H \geq 2H$ and $0 < \tan A \leq h/R$;

$$[K + 2\pi R^2 q_2 h(\text{ctn } A)(Rh \text{ ctn } A)^{\frac{1}{2}}/3 - \pi R^3 q_2 h(\text{ctn } A) - \quad (5)$$
$$2\pi R^2 q_2 h(Rh \tan A)^{\frac{1}{2}}/3 + \pi R^2 q_2 h^2/2](\sin A)/m > 0$$

when $H > 2h$ and $h/R \leq \tan A \leq H^2/4Rh$; and $$[K + \pi R q_2 H^3 (\text{ctn } A)^3/48 - \pi R^3 q_2 h(1 - h/H)\text{ctn } A + \quad (6)$$
$$\pi R q_2 H^3 (\text{ctn } A)/24 - \pi R^2 q_2 h H(1 - h/H)/2](\sin A)/m > 0$$

when $H \geq 2h$ and $H^2/4Rh \leq \tan A \leq$ infinity.

In order for the sensor to level itself from a specified deflection angle, $A = A_s$, Inequalities (4), (5), and (6) must be satisfied in the range $0 < A \leq A_s$, and the minimum disk radius corresponding to that range must be taken as the maximum permissible design value of R for the specified deflection. For arbitrary deflection in the range $0 < A \leq 90°$, the maximum permissible design value of R, denoted by $R_c$, for which the sensor will level itself may be found by means of the following equations:

$$K/\pi R_c^2 q_2 h^2 + 2(\text{ctn } A_c)^{3/2}(1 - \tan^2 A_c)(R_c/h)^{\frac{1}{2}}/3 - \quad \text{(7-a)}$$
$$R_c(\text{ctn } A_c)/h + \frac{1}{2} = 0$$

where $$h/R_c \leq \tan A_c \leq H^2/4R_c h, \quad \text{(7-b)}$$

$H/h > 2$, $h > 0$, $R_c/h \geq 16/9$, $\tan^{\frac{1}{2}} A_c = \text{ctn}^{-\frac{1}{2}} A_c = Z^{\frac{1}{2}} - [-Z + 3(R_c/hZ)^{\frac{1}{2}}/4]^{\frac{1}{2}}$, and $Z = [9R_c/16h + (-1 + 81R_c^2/256h^2)^{\frac{1}{2}}]^{\frac{1}{2}}/2 +$
$\quad [9R_c/16h - (-1 + 81R_c^2/256h^2)^{\frac{1}{2}}]^{\frac{1}{2}}/2$;

$$K/\pi R_c^2 q_2 h^2 + H^3(\text{ctn } A_c)^3/48R_c h^2 - H(1 - h/H)/2h -$$
$$[R_c h(1 - h/H) - H^3/24R_c](\text{ctn } A_c)/h^2 = 0$$

where $$H^2/4R_c h \leq \tan A_c \leq \text{infinity}, \quad \text{(7-c)}$$

$H/h \geq 2$, $h > 0$, $R_c/h \geq (1 - h/H)^{-\frac{1}{2}}(H/h)^{3/2} 6^{\frac{1}{2}}/12$, and $\text{ctn } A_c = [16R_c^2 h H(1 - h/H) - 2H^4/3]^{\frac{1}{2}}/H^2$; and, for $H/h = 2$, Eq. (7-b) reduces to $$3R_c(K'/\pi R_c^2 q_2 h^2 - \frac{1}{2})/h = (R_c^2/h^2 - \frac{2}{3})^{3/2}$$

where $h > 0$, $R_c/h \leq 6^{\frac{1}{2}}/3$, and $K' = K$ with H set equal to 2h.

In general, Eq. (7-a) applies when the ratio H/h is outside the neighborhood of 2, Eq. (7-b) applies when H/h is in the neighborhood of 2, and Eq. (7-c) applies when H/h equals 2. Given a specific disk radius ($R_s$) and other pertinent design parameters, the sensor will level itself if $R_s$ is less than or equal to $R_c$. Minimum values of $R_c$ occur when H/h equals 2.

When void depth (h) is adjusted to smaller values with no change in conductive fluid volume, $R_c$ decreases. This effect may be determined from Eqs. (7) by setting $h = h_i Q_1^{-1}$ and $H = H_8 - (1 - 1/Q_1)h_i$, where $Q_1$ is greater than or equal to unity and the subscript i denotes initial values. When h is reduced to smaller values by increasing conductive fluid volume, $R_c$ increases. This effect may be determined from Eqs. (7) by setting $h = h_i Q_1^{-1}$ and $H = H_i$. Although Eqs. (7) are invalid and Inequalities (4) and (6) have no valid range in A when h=0, Inequality (5) then becomes $R^2(C_1^* + C_2) + R(2C_3) + (C_4 + K_o) > 0$, where $C_1^* = C_1$ with h set equal to zero, showing that all $R \geq 0$ satisfy the sizing condition when h=0.

For purposes of example, let an expedient model of the device be defined by H=2h, b=H'−3D/4, r=2D, w=D/2, c=D/4, u=H'−D/2, R*=R, H*=H, $q_1 = q_2$, and T=0. Then, $$K' = 7qDH'(H' - D/2)/4 + \pi R^2 q_2(H'h - hD/4 + 3h^2/2) \quad (8)$$

where $q = q_1 v/S$,
$v = \pi D(252DH' - 7D^2)/64$, and $S = (3/16 - \pi/12 - 3^{\frac{1}{2}}/16)D^2 + 7DH'/2$, After substituting the right side of Eq. (8) for K' in Eq. (7-c) and setting the parameters D, H' and h equal to various values, Eq. (7-c) is solved for $R_c$ by iteration, thereby determining the ranges $R \leq R_c$ of possible disk radii for a small sample of sensor families based on said expedient model, Table 3.

TABLE 3

| | Sizing Condition Data Sample | | | |
|---|---|---|---|---|
| h, mm | D, mm | H, mm | $R_c$, mm | A', degs. |
| 1 | 6.35 | 25.4 | 20.185 | 2.836 |
| 1 | 24.5 | 25.4 | 33.968 | 1.686 |
| 1 | 6.35 | 254 | 125.215 | 0.458 |
| 1 | 25.4 | 254 | 125.215 | 0.458 |
| 10 | 10.0 | 20.0 | 32.989 | 16.864 |
| 100 | 10.0 | 10.0 | 204.551 | 26.053 |

Applications

Representative type applications of the sensor are as follows:

(1) It can detect actual or attempted movements of any object.

(2) It can measure the orientation of an object with respect to the vertical.

(3) It can indicate when an object changes an arbitrary orientation by greater than a specified angle with respect to the vertical.

(4) Any object that is fixed to the sensor disk or that replaces it is self-leveling if the sizing condition is satisfied.

(5) Any object the orientation of which can be controlled and to which the sensor is fixed may be maintained at a specified orientation with respect to the vertical via sensor means in conjunction with a servo-mechanism.

(6) It can signal when the surface of an object in the neighborhood of a point on the object moves through more than a pre-set angle relative to the vertical.

(7) It can determine when an object is subjected to an acceleration exceeding a specific value in the horizontal plane.

(8) It can indicate when an object is moving or shaking or vibrating too much or too little.

(9) It can provide a warning when water or wind exceeds a specific roughness or when earth tremors go above a set level.

(10) It can be designed for detonating mines, detecting the passage of troops and/or military equipments, evaluating the effectiveness of artillery or aerial bombing in a given area, and for other applications depending upon the sensing of acceleration and/or orientation and/or impulse.

What is claimed and desired to be secured by United States Letters Patent is:

1. A device for determining orientation with respect to the vertical of an arbitrary plane called the object plane, said plane a portion of which represents an arbitrary object is fixed with respect to both the object and the device, comprising a first rod having cylinder geometry fixed to a plane of attachment at a suitable place thereon, said plane of attachment comprising the tangent plane to an arbitrary portion of the object's surface or that of a bracket or housing supporting the device; a reference plane at known orientation to the object plane and intersecting the axis of the first rod at known angle; a second rod having circular cylinder geometry the axis of which intersects the axis of the first rod at the pivot point of a pivot located at the end of the first rod distance L' measured along the axis of the first rod from its intersection with the reference plane; means for aligning the second rod with the vertical by rotating the second rod about the pivot point; means for fixing the second rod relative to the first rod; a datum plane a portion of which comprises either of the flat surfaces of a disk having right circular cylinder geometry, a portion of said flat surface being fixed to the second rod and intersecting the axis of the second rod at known distance c from the pivot point; and means for measuring y, the shortest line segment between said reference and datum planes of the generatrix of a cylindrical surface with its directrix a circle or ellipse in the reference plane and its generatrix parallel to the axis of the first rod, said surface intersecting the datum plane in a circle or ellipse; the angle B' between the axes of the first and second rods being ascertainable from y and other known quantities, and the orientation of the reference plane with respect to the vertical being ascertainable from B'.

2. In a device as recited in claim 1, wherein said first rod is normal to said reference plane, said datum plane is normal to said second rod, and said means of measuring y comprises a portion of the first rod being a screw coaxial therewith having external micrometer thread on which a complementarily threaded micrometer collar of outer diameter D* fits, one end of the collar being square with the first rod for measurement purposes, said end being adapted to move along the axis of the first rod an incremental displacement such that y is measured when a portion of said end touches said datum plane, the orientation of said reference plane with respect to the vertical being the complement of B' ascertainable from y since c, D* and Y are known by design and $\tan B' = (Y-y)/(D^*/2 \pm c \tan B'/2), B' \leq B$ where $Y = y$ when $B' = 0$; the + and − signs on c denote it being measured from said pivot point toward and away from said plane of reference, respectively, when the first and second rods are parallel; for the +c case, $Y = L' - c, L' \geq w^* \sin B + c \cos B$ $B = \arctan[(A_1 - A_2)/A_3], c < D^*/2, w^* \geq D^*/2$ $\quad = \arctan[(w^*/D^* - D^*/4w^*)], c = D^*/2, w^* \geq D^*/2$ $\quad = \arctan[(-A_1 + A_2)/(-A_3)], c > D^*/2, w^* \geq D^*/2;$ for the −c case, $Y = L' + c, L' \geq w^* \sin B - c \cos B$ $B = \arctan[(A_2 - A_1)/A_3], c < D^*/2, w^* \geq D^*/2$ $\quad = \arcsin(d^*/2c), c \geq D^*/2, w^* \geq D^*/2;$ $A_1 = (1 + w^{*2}/c^2 - D^{*2}/4c^2)^{\frac{1}{2}} D^*/c; A_2 = 2w^*/c;$ $A_3 = 2(-1 + D^{*2}/4c^2);$ $d^*$ is the inner diameter of said micrometer collar; $L'$ is normal distance from said reference plane, which for purposes of example is assumed approachable by but impenetrable to pivoting portions of the device, to the pivot point; $w^*$ is the radius of the datum circle, that area of the datum plane to points of which all $y$ are measured, the center of said circle being the intersection of the axis of the second rod and the datum plane; and wherein, for the $-c$ case with $c \geq D^*/2$, $B = \arcsin(d^*/2c) > 90°$ based on continuity considerations and accuracy requirements of $y$ but, as $B' \to 90°$ with $c = D^*/2$, $Y - y \to w^* + c$ and $D^*/2 - c \tan B'/2 \to 0$ and in the limit $B = \arcsin D^*/2c = 90°$.

3. In a device as recited in claim 1, means for monitoring said orientation and determining threshold variations in it comprising a closed hollow right circular cylinder attached coaxially to said second rod, the cylinder replacing said disk and having inside radius $R$ and inside height $H$, where $0 < 2R/H < \infty$, and containing electrically conductive fluid of depth $H - h$, where $h$ is void depth when the cylinder is level, two electrodes arranged such that one of them is in contact with the conductive fluid and the other is positioned symmetrical with the axis of the cylinder a spacing $h' \leq h$ above the surface of the conductive fluid when the cylinder is level, and associated circuitry including a source of electrical energy and means of signalling when the two electrodes are electrically connected by movement of the conductive fluid upon a change in orientation of the object.

4. In a device as recited in claim 3, said datum plane being the exterior face of said cylinder to which said distance $c$ is measured.

5. In a device as recited in claim 3, means for monitoring orientation of said reference plane with respect to the vertical and determining when it changes by at least angle $A$ comprising the cylinder having a dielectric wall, a conductive top face (i.e., $h' = h$) and $H$, $R$ and $h$ known by design or otherwise since $$\tan A = h/R, \text{ for } H \geq 2h; \text{ and}$$

$$D_4 + 3d_4 R^2 \tan^2 A \arccos(-d_4/R \tan A) = 0, \text{ for } h < H \leq 2h,$$

when $d_4 \geq 0$, $H/2R \leq \tan A \leq H/R$, $\pi h/(\pi - \tfrac{8}{3}) \leq H \leq 2h$, when $d_4 \leq 0$, $H/R \leq \tan A < \infty$, $h < H \leq \pi h/(\pi - \tfrac{8}{3})$, where $d_4 = H - R \tan A$, $D_4 = (2R^2 \tan^2 A + d_4^2)(R^2 \tan^2 A - d_4^2)^{\frac{1}{2}} - 3\pi R^2(H - h)\tan^2 A$, and the relationships for $A$ are based on actual geometry assuming the conductive fluid surface is a plane and the fluid volume is constant; and wherein, based on a lamina of conductive fluid containing the axis of said cylinder and assuming the fluid surface is a line and the fluid area a constant on the lamina, $$\tan A = h/R, \text{ for } H \geq 2h, \text{ and}$$

$$\tan A = H^2/4R(H - h), \text{ for } h < H \leq 2h.$$

6. In a device as recited in claim 3 means for adjusting one or more of the quantities $H$, $R$ and $h$.

7. In a device as recited in claim 3, wherein said electrode positioned above the conductive fluid terminates in an annular electric contact of outer radius $R' \leq R$, said means for monitoring orientation of said reference plane with respect to the vertical and determining when it changes by at least angle $A$ comprising $h$, $h'$, $R$, $R'$ and $H$ being known by design or otherwise since $$\tan A = h'/R', \ 0 \leq \tan A \leq (H - h)/R, \ h < H \leq 2h;$$

$$D_1 + 3d_1 R^2 \tan^2 A \arccos(-d_1/R \tan A) = 0,$$

when $d_1 \geq 0$, $(H - h)/R \leq \tan A \leq \tan A_1$;

$$\pi h/(\pi - \tfrac{8}{3}) \leq H \leq 2h,$$

when $d_1 \leq 0$, $(H - h)/R \leq \tan A \leq \tan A_2$, $h < H \leq \pi h/(\pi - \tfrac{8}{3})$;

$$D_2 + 3d_1 R^2 [\arcsin(d_1/R \tan A) + \arcsin(d_2/R \tan A)]\tan^2 A = 0,$$

when $d_1 \geq 0$, $\tan A_1 \leq \tan A < \infty$, $\pi h/(\pi - \tfrac{8}{3}) \leq H \leq 2h$, when $d_1 \leq 0$, $\tan A_2 \leq \tan A < \infty$, $h < H \leq \pi h/(\pi - \tfrac{8}{3})$;

$$D_3 + 3d_3 R^2 \tan^2 A_i \arccos(-d_3/R \tan A_i) = 0$$

when $i = 1$, $d_3 \geq 0$, $H/2R \leq \tan A_1 \leq H/R$, $$\pi h/(\pi - \tfrac{8}{3}) \leq H \leq 2h,$$

when $i = 2$, $d_3 \leq 0$, $H/R \leq \tan A_2 < \infty$, $h < H \leq \pi h/(\pi - \tfrac{8}{3})$;

$$HR^2 \arccos(R'/R) - HR'(R^2 - R'^2)^{\frac{1}{2}} - \pi R^2(H - h) = 0,$$

$\tan A = \infty$, $h < H \leq 2h$;

$\tan A = h'/R'$, when $0 \leq \tan A \leq h/R$, $H \geq 3\pi h/2$, when $0 \leq \tan A \leq H/2R$, $2h \leq H \leq 3\pi h/2$;

$$D_2 + 3d_1 R^2 [\arcsin(d_1/R \tan A) + \arcsin(d_2/R \tan A)]\tan^2 A = 0,$$

$d_1 > 0$, $H/2R \leq \tan A < \infty$, $2h \leq H \leq 3\pi h/2$;

and $$2(R^2\tan^2 A - d_2^2)^{3/2} + 3d_2^2(R^2\tan^2 A - d_2^2)^{\frac{1}{2}} +$$

$$3d_2 R^2 \tan^2 A \arccos(-d_2/R \tan A) - 3\pi R^2 h \tan^2 A = 0,$$

$h/R \leq \tan A \leq H/R$, $H \geq 3\pi h/2$;

where as appropriate $d_1 = H - h + h' - R' \tan A$, $d_2 = h - h' + R' \tan A$, $d_3 = H - R \tan A_i$, $D_1 = (2R^2\tan^2 A + d_1^2)(R^2\tan^2 A - d_1^2)^{\frac{1}{2}} - 3\pi R^2(H - h)\tan^2 A$, $D_2 = (2R^2\tan^2 A + d_1^2)(R^2\tan^2 A - d_1^2)^{\frac{1}{2}} -$ $$2(R^2\tan^2 A - d_1^2)^{3/2} - d_2^2(R^2\tan^2 A - d_2^2)^{\frac{1}{2}} +$$

$$3HR^2\tan^2 A \arccos(d_2/R \tan A) - 3\pi R^2(H - h)\tan^2 A, \text{ and}$$

$D_3 = (2R^2\tan^2 A_i + d_3^2)(R^2\tan^2 A_i - d_3^2)^{\frac{1}{2}} - 3\pi R^2(H - h)\tan^2 A_i;$ wherein the above relationships for angle $A$ are based on actual geometry assuming the conductive fluid surface is a plane and the fluid volume is constant; and wherein, based on a lamina of conductive fluid containing the axis of said cylinder and assuming the fluid surface is a line and the fluid area a constant on the lamina, $$\tan A = h'/R', \ h' \leq (H - h)R'/R$$

$$= \frac{2B_1}{-B_2 + (B_2^2 - 4B_1 B_3)^{\frac{1}{2}}},$$

$$\frac{(H - h)R'}{R} \leq h' \leq h - \frac{H^2(R - R')}{4R(H - h)}$$

-continued
$$= (h' - h + H/2)/(R + R' - 2Rh/H),$$

$$h' \geqq h - \frac{H^2(R - R')}{4R(H - h)}$$

where $R(-1 + 2h/H) \leqq R' \leqq R, h < H \leqq 2h, 0 \leqq h' \leqq h,$ $$B_1 = (H - h + h')^2,$$

$$B_2 = 2(R - R')(H - h + h') - 4R(H - h), B_3 = (R - R')^2;$$

and $$\tan A = h'/R', h' \leqq hR'/R$$

$$= \frac{(Rh + B_4)^2}{(R + R')^2 Rh},$$

$$hR'/R \leqq h' \leqq h - H + H^2(R + R')/4Rh$$

$$= \frac{h' - h + H/2}{R + R' - 2Rh/H}, h' \geqq h - H + \frac{H^2(R + R')}{4Rh},$$

$$H \leqq \frac{4Rh}{R + R'}$$

where $0 < R' \leqq R, H \geqq 2h, 0 \leqq h' \leqq h,$ $$B_4 = (Rh)^{\frac{1}{2}}(Rh' - R'h + R'h')^{\frac{1}{2}}.$$

8. In a device as recited in claim 3, means for adjusting one or more of the quantities h, h', R, R' and H.

9. In a device as recited in claim 1, said pivot of said first rod being replaced by a universal ball a diameter of which is coaxial with said first rod, and a portion of said second rod being replaced by a universal socket for said ball, said socket being coaxial with said second rod.

10. In a device as recited in claim 1, means for self alignment of said second rod with the vertical comprising configuration and other physical constraints on the device in such a way that the net restoring torque on the pivotal portion of the device when unconstrained remains greater than zero for any intolerable deflection of the second rod from the vertical.

11. In a device as recited in claim 1, said place of attachment for said first rod including said place being on housing providing means of support both protecting the assembly and enabling the device to rest stably upon the surface of the object or to be attached thereto.

12. In a device as recited in claim 9, said place of attachment including that occupied by a screw extending from the ball coaxially with said diameter of the ball into supporting structure.

13. In a device as recited in claim 9, said means for fixing the socket axis relative to said diameter of the ball including expanding means in the ball.

14. In a device as recited in claim 12, means for measuring said distance y comprising a portion of said screw having external micrometer thread and a collar, the collar having adjustment provision including an internal thread complementary to said external thread and a transverse end, and the collar having a fiducial position on the external thread and a length proportioned for advancement from the fiducial position to a position with said transverse end in contact with said datum plane.

15. In a device as recited in claim 14, said reference plane being normal to said diameter of the ball, said socket being a right circular cylinder the top flat surface of which surrounding a portion of the ball protruding therefrom is, the device being the exterior top surface of a right circular cylindrical socket having its arranged in said +c case configuration such that $$\tan B' = (Y - y)/(D^*/2 + c \tan B'/2), B' \leqq B, \text{ where}$$

$$d^* < D^* \leqq 2(r \cos B - c \sin B), (D^2 - 4c^2)^{\frac{1}{2}} \leqq d^* < D^*;$$

$$B = \arctan \frac{d(D^2 - d^2)^{\frac{1}{2}} - 2c(D^2 - 4c^2)^{\frac{1}{2}}}{d^2 - 4c^2};$$

$$Y = L' - c, L' \geqq L + (D^2 - d^2)^{\frac{1}{2}}/2;$$

$$L \geqq r \sin B + c \cos B - (D^2 - d^2)^{\frac{1}{2}}/2 \text{ for } R^* \leqq r \text{ or for}$$

$$R^* > r \text{ and } R^* - r \leqq H' \text{ ctn } B;$$

$$L \geqq R^* \sin B - (b + D/2)\cos B - (D^2 - d^2)^{\frac{1}{2}}/2 \text{ for } R^* > r \text{ and}$$

$$R^* - r \geqq H' \text{ ctn } B; H' = b + c + D/2;$$

r is radius of socket; D is diameter of ball; L' is distance along said diameter from said reference plane to center of ball; d is diameter of circle within which supporting structure for the device is attached to the ball, said circle being the intersection of ball's surface and that of a plane structural normal to said diameter in northern zone of ball; L is normal distance from said reference plane, which for purposes of example is assumed approachable by but impenetrable to pivoting portions of the device, to the plane of said circle; R* is outside radius of said hollow cylinder containing conductive fluid; H' is axial length of socket; b is normal distance along said diameter from south pole of ball to center of top outside surface of said hollow cylinder; $c < D/2$ is normal distance from center of ball to top face of socket; and, if the device does not include said hollow cylinder or if the hollow cylinder is inside the socket, the inequality with condition $R^* \leqq r$ is the only one that pertains to L.

* * * * *